United States Patent
White

(10) Patent No.: US 7,789,410 B1
(45) Date of Patent: Sep. 7, 2010

(54) PORTABLE FOLDING MOTORCYCLE STAND

(76) Inventor: Dana Larue White, 1154 W. Fork Way, Watkins, CO (US) 80137

( * ) Notice: Subject to any disclaimer, the term of this patent is extended or adjusted under 35 U.S.C. 154(b) by 536 days.

(21) Appl. No.: 11/519,517

(22) Filed: Sep. 12, 2006

(51) Int. Cl.
B62H 7/00 (2006.01)

(52) U.S. Cl. ............... 280/293; 280/296; 280/298; 280/300; 211/21; 211/22; 248/165

(58) Field of Classification Search ........... 280/293, 280/295–303; 211/22, 21; 248/688, 351, 248/352, 165
See application file for complete search history.

(56) References Cited

U.S. PATENT DOCUMENTS

| | | | | |
|---|---|---|---|---|
| 506,600 | A | | 10/1893 | Marks |
| 535,160 | A | * | 3/1895 | Campbell ............ 280/293 |
| 556,758 | A | | 3/1896 | Lefebre, Jr. |
| 591,969 | A | * | 10/1897 | Hiekisch ............ 211/22 |
| 603,422 | A | * | 5/1898 | Burkhardt ........... 211/22 |
| 622,642 | A | | 4/1899 | Tomlinson |
| 640,631 | A | * | 1/1900 | Conti ............... 211/22 |
| 653,681 | A | | 7/1900 | Lee |
| 1,241,486 | A | | 10/1917 | Armstrong |
| 2,630,296 | A | * | 3/1953 | Lucker ............. 254/99 |
| 3,931,991 | A | * | 1/1976 | Marchello ........... 280/295 |
| 4,026,546 | A | * | 5/1977 | Omori .............. 482/61 |
| 4,979,759 | A | * | 12/1990 | Solovay ............ 280/293 |
| D350,089 | S | | 8/1994 | Greenfield |
| 5,346,238 | A | | 9/1994 | Greenfield |
| 5,417,629 | A | * | 5/1995 | Phipps ............. 482/61 |
| 5,498,015 | A | * | 3/1996 | Trout et al. ......... 280/293 |
| 5,623,855 | A | | 4/1997 | Miles |
| 5,833,178 | A | * | 11/1998 | Plasse et al. ........ 248/27.8 |
| 6,488,157 | B2 | * | 12/2002 | Chen ............... 211/20 |
| 6,948,621 | B1 | | 9/2005 | Lassanske et al. |
| 6,976,593 | B2 | * | 12/2005 | Fierstein ........... 211/17 |

OTHER PUBLICATIONS

Typical Welded Steel Motorcycle Stand.

* cited by examiner

*Primary Examiner*—Kevin Hurley
*Assistant Examiner*—Maurice Williams

(57) ABSTRACT

A motorcycle support stand with a folding design, not attached to the motorcycle, but available for portability directly on motorcycles that have no attached means of upright support. The support device comprises an extended finger for intermittently interfacing with the hollow rear axle holes on these types of motorcycles, two support legs that pivot near the top, and a bottom brace member that pivots on the bottom of one support leg and intermittently latches to the bottom of the other support leg. When folded in this triangle shaped configuration, the extended finger can be inserted into the hollow rear axle hole, at the exact center of the rear wheel hub, on either side, and the weight of the motorcycle can be leaned onto the stand. When the stand is folded to its small straight configuration, it can be transported on the motorcycle for use in remote locations. The rider also has the option of having no stand on the bike, for competition situations.

1 Claim, 1 Drawing Sheet

PORTABLE FOLDING MOTORCYCLE STAND

CROSS-REFERENCE TO RELATED APPLICATIONS

Not Applicable

FEDERALLY SPONSORED RESEARCH

Not Applicable

SEQUENCE LISTING OR PROGRAM

Not Applicable

BACKGROUND OF THE INVENTION

1. Field of Invention

This invention relates to motorcycle support stands, specifically to such stands which are used for supporting dirt-bikes.

2. Prior Art

Most motorcycles have fold down type kickstands. Motorcycles designed specifically for off-road use are not sold from the factory with attached stands. Off-road or dirtbikes are designed to be as lightweight as possible, so permanent fold down type kickstands were eliminated. Designed mainly for competition, these bikes were now inconvenient for use in remote locations without means of upright support. Off-road motorcycle stands are available with bolt-on designs, these however are un-desirable to those who want lightweight bikes in competition situations, but still would like a means of upright support for the motorcycle when pleasure riding in remote locations.

Stands of various types have been designed around the concept of being separate from the motorcycle or bicycle. See, for example, the stands shown in U.S. Pat. Nos. 1,241,486 Armstrong—622,642 Tomlinson—6,976,593 Fierstein—506,600 Marks—and 556,758 Lefebre. Of these designs, few would support the weight of a modern motorcycle, and those that could support the weight, are not truly convenient for lightweight portability. These designs do not incorporate small size, low weight, and high strength.

Modern off-road motorcycles have rear axles that are hollow to eliminate more weight, none of the previously mentioned patents utilize the hollow rear axle hole of the motorcycle or two wheeled vehicle as an insertion point for motorcycle support. Modern dirtbikes endure very rough terrain at high speeds, anything carried directly on the bike needs to be small and lightweight. The previously mentioned patents showed designs too heavy, too bulky, too big, or too weak.

OBJECTS AND ADVANTAGES

Accordingly, several objects and advantages of my invention are:

(a.) To provide a motorcycle stand that is easily portable for carry directly on a dirtbike.
(b.) To provide a motorcycle stand that can be easily and totally removed for competition.
(c.) To provide a motorcycle stand that folds to its portable size quickly and simply.
(d.) To provide a motorcycle stand that is lightweight but still has superior strength to support the weight of a modern off-road motorcycle in an upright position.
(e.) To provide a motorcycle stand of high quality, at an affordable price.

Further objects and advantages are to provide a stand that can be transported over the most extremely rough terrains at high speeds, with minimal risk of damage to bike or rider, then allow the rider means of upright support of the motorcycle in remote locations.

SUMMARY

In accordance with the present invention, a portable folding motorcycle stand comprises two support legs connected so they can pivot at the top and open at the bottom, to allow a third member to pivot down and lock with the end of the other support leg, forming a triangle, with a bent protruding finger at the top, for insertion into the hollow rear axles of off-road motorcycles, for upright support and stability.

DRAWINGS

Figures

REFERENCE NUMERALS

| | |
|---|---|
| 10 | main support leg |
| 12 | pivoting support leg |
| 14 | bottom brace member |
| 16 | top pivot point |
| 18 | locking joint |
| 20 | bottom pivot point |
| 22 | axle hole insertion finger |

DETAILED DESCRIPTION

Figure 1:
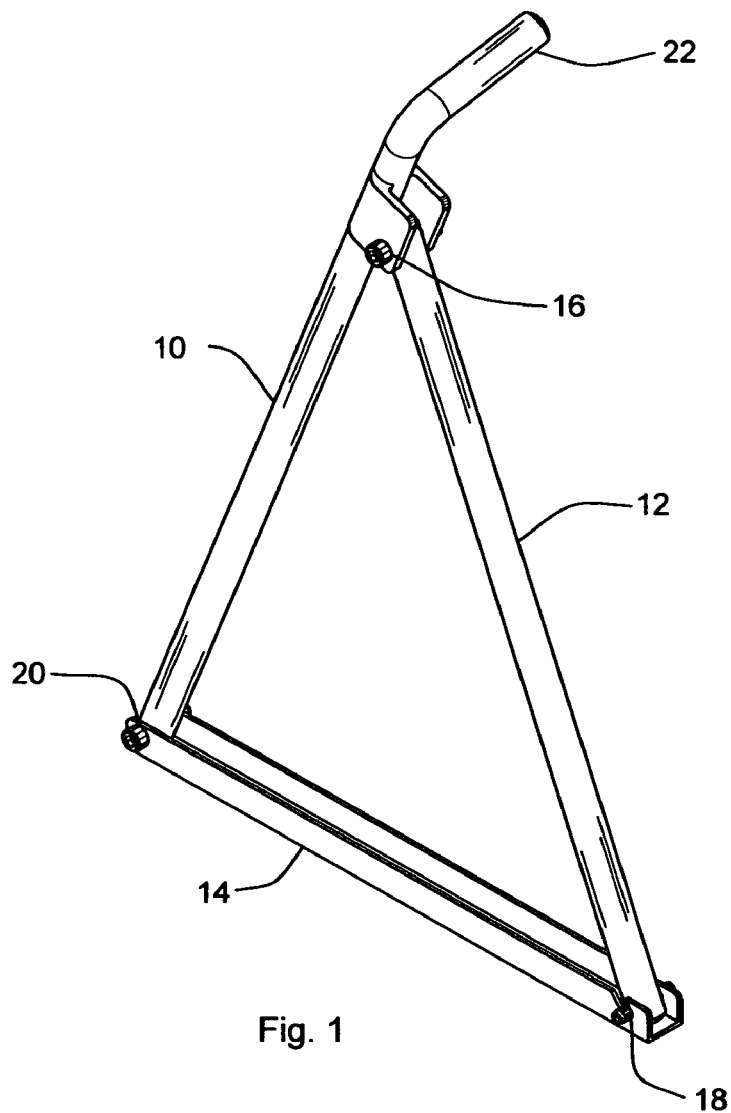
FIG. 1 shows the portable folding motorcycle stand in its locked open support position, with its top bent projecting finger angled for insertion into the hollow rear axle hole of the motorcycle.
Figure 2:
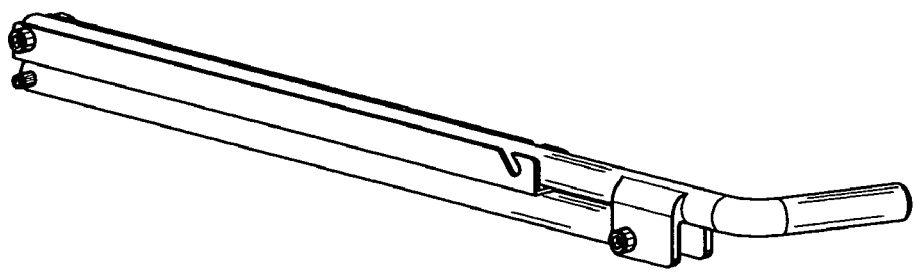
FIG. 2 shows the portable folding motorcycle stand in its folded portable carrying position.

FIGS. 1 and 2

Preferred Embodiment

A preferred embodiment of the motorcycle stand of the present invention is illustrated in FIG. 1 (stand folded out and locked in support position) and FIG. 2 (stand folded into its small portable position). The stand has a main support leg 10 which is bent to a seventy degree angle at the top to provide the projecting axle hole insertion finger 22. The pivoting support leg 12 is attached to the main support leg directly below the bend point with a pivoting connection 16. These two legs are the main source of motorcycle support and can be fabricated out of steel or any metal strong enough to support the weight of the motorcycle. The present preferred material for the support legs is stainless steel, for strength and rust resistance reasons. The diameter of these support leg rods is ½ inch, to allow for the axle hole insertion finger 22, to slip into the hollow axle holes of most brands of off-road motorcycles. The axle hole insertion finger 22 is two inches long, and the total length of the main support leg 10 is sixteen inches, including the bend radius, and the axle hole insertion finger. The total length of the pivoting support leg 12 is twelve inches long.

The bottom brace member 14 is fabricated from stainless steel channel, 10 inches long, by ½ inch wide, by ½ inch high, by 1/16 inch thickness. It has a 3/16 inch hole drilled at its pivot point 20 and a 3/16 inch notch cut at a 45 degree angle at the locking joint 18. This locking joint is where the bottom brace member 14 and the pivoting support leg 12 can separate, allowing the stand to fold at its pivot points 16 20 into the portable position as seen in FIG. 2. The notch in the bottom brace member 14 intercepts a ⅛ inch by ¾ inch roll pin, that is inserted horizontally through the bottom ¼ inch of the pivoting support leg 12. This pin protrudes equally on each side of the leg, and together, the notch and pin interface, to make the locking joint 18. This locking joint 18 could be configured in several different ways, as long as the pivoting support leg 12 and the bottom brace member 14 are able to intermittently lock together or separate.

The pivot point 20 is simply a 3/16 inch hole drilled through the end of the bottom brace member 14 and continuing through the bottom ¼ inch of the main support leg 10. The hole allows the insertion of a ¾ inch long screw, and when a nut is threaded onto the opposite side, the pivot point 20 allows the bottom brace member 14 to swing up and embrace the main support leg 10.

The pivot point 16 has two pieces of stainless steel, 1 inch wide, by 1 inch high, by ⅛ inch thickness, welded to the main support leg 10 to form the basis of the pivot point 16. The two pieces of stainless steel are welded 1 inch below the bend point of the main support leg 10 and protrude out with ½ inch of space between them. A 3/16 inch hole is drilled through the center of the welded pieces, and also through the top ¼ inch of the pivoting support leg 12. The hole allows the insertion of a ¾ inch long screw, and when a nut is threaded onto the opposite side, the pivot point 16 allows the pivoting support leg 12 to fold parallel with the bottom brace member 14 and the main support leg 10 as seen in FIG. 2.

Operation FIGS. 1 and 2

The manner in which the portable folding motorcycle stand is operated is a simple process of folding or un-folding the stand, and allowing the motorcycle to lean into the stand for support by way of the hollow rear axle hole. The rider will remove the stand from wherever it is mounted on the motorcycle, it will be in the folded position as seen in FIG. 2. The rider will then extend the pivoting support leg 12 out using pivot point 16, and extend the bottom brace member 14 down using pivot point 20. The rider then slides the protruding pin at the bottom of the pivoting support leg 12 into the notch at the end of bottom brace member 14, forming a locking joint 18 and transforming the stand to its triangle support position as seen in FIG. 1.

The rider at this point inserts the angled axle hole insertion finger 22 as far as possible into the hollow rear axle bolt hole located exactly in the center of the motorcycles rear wheel hub, on either side of bike, left or right. The motorcycle is now able to lean into the triangle shaped stand for stability and support.

When the rider is again ready to ride the motorcycle, the rider will lift the bike into an upright position relieving the weight of the bike from the stand, and pull the stands axle hole insertion finger 22 out of the motorcycles hollow rear axle hole. The rider will then disconnect the locking joint 18 and fold the bottom brace member upward on its pivot point 20 as far as possible, to embrace and engulf the main support member 10. The rider can now swing the pivoting support leg 12 inward on its pivot point 16 bringing both support legs 10 12 and the bottom brace member 14 back to the straight portability position as seen in FIG. 2. The stand can then be stored once again on the motorcycle or in a backpack.

Advantages

From the description above, a number of advantages of my portable folding motorcycle stand become evident:

(a) In competition riding situations, the motorcycle rider now would have the option of easily and quickly removing the stand to gain the lightweight advantage, then for weekend pleasure riding situations, the stand would be readily available for upright motorcycle support in remote locations.

(b) The portable folding motorcycle stand eliminates the dangers of the bolt on stand, that can fold down on impact of landing a jump, leaving the rider in motion and unaware of the situation.

(c) The portable folding motorcycle stand can be easily and conveniently carried on the handlebars, on the fork leg, on the motorcycle frame tube, in a backpack or in a waist pack.

(d) The stands simple folding design and lightweight allow for quick and easy interface of the protruding finger into and out of the motorcycles hollow rear axle bolt hole for upright support.

CONCLUSION, RAMIFICATIONS, AND SCOPE

Accordingly, the reader will see that the portable folding motorcycle stand gives the rider options that they did not have in the past. Riding in remote areas no longer means purchasing and bolting on a heavy stand.

Previous attempts to fabricate a stand that incorporate all of the qualities of the portable folding motorcycle stand embodiment, have fallen short in one aspect or another. Size, weight, strength, simplicity, durability, and functionality, separate this stand from the others.

Although the description of the portable folding motorcycle stand contains many specific details, these should not be construed as limiting the scope of the invention, buy merely as an overview to some of the presently preferred embodiments of this invention. For example, rods could be tubes, stainless steel could be aluminum, pivot screws could be pins, etc.

Thus the scope of the invention should be determined by the appended claims and their legal equivalents, rather than by the descriptive examples given.

I claim:

1. I claim; A motorcycle support stand for the upright support of a motorcycle, comprising;
    a. first and second elongated support legs fabricated of rigid material coupled pivotally near the top, to form one angle of a triangle configuration;
    b. an elongated bottom brace member fabricated of rigid, channel shaped material, coupled pivotally at one end to the bottom of the first said support leg, enveloping said first support leg when in a folded position, and at the other end being adapted for intermittently receiving and affixing to the bottom of the other said second support leg, wherein the bottom brace lies between the first and second support legs in the folded position;
    c. an insertion finger at the top of said support stand, bent from an extension of the first said support leg, to an angle of less than ninety degrees in relation to the plane of the triangle configuration for interface with motorcycle axle hole;
       wherein said support stand is detachable from said motorcycle.

* * * * *